United States Patent
Yates et al.

(10) Patent No.: US 9,984,016 B2
(45) Date of Patent: May 29, 2018

(54) SYSTEMS AND METHODS FOR HARDWARE ARBITRATION OF A COMMUNICATIONS BUS

(71) Applicant: Dell Products L.P., Round Rock, TX (US)

(72) Inventors: Douglas A. Yates, Spicewood, TX (US); Jared Terry, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 240 days.

(21) Appl. No.: 14/989,552

(22) Filed: Jan. 6, 2016

(65) Prior Publication Data

US 2017/0192917 A1     Jul. 6, 2017

(51) Int. Cl.
*G06F 13/00* (2006.01)
*G06F 13/364* (2006.01)
*G06F 13/42* (2006.01)
*G06F 13/16* (2006.01)
*H04L 12/403* (2006.01)

(52) U.S. Cl.
CPC ........ *G06F 13/364* (2013.01); *G06F 13/1652* (2013.01); *G06F 13/4282* (2013.01); *G06F 13/4291* (2013.01); *H04L 12/403* (2013.01)

(58) Field of Classification Search
None
See application file for complete search history.

(56) References Cited

U.S. PATENT DOCUMENTS

| | | | | |
|---|---|---|---|---|
| 7,039,734 B2* | 5/2006 | Sun | ..................... | G06F 13/4291 710/110 |
| 9,727,506 B2* | 8/2017 | Takahashi | ............. | G06F 13/364 |
| 2013/0254198 A1* | 9/2013 | Irish | .................. | G06F 17/30241 707/736 |
| 2015/0378959 A1* | 12/2015 | Jones | .................. | G06F 13/4291 714/5.11 |

* cited by examiner

*Primary Examiner* — Henry Tsai
*Assistant Examiner* — Aurangzeb Hassan
(74) *Attorney, Agent, or Firm* — Jackson Walker L.L.P.

(57) ABSTRACT

In accordance with embodiments of the present disclosure, an information handling system may include a communications bus, at least one target device communicatively coupled to the communications bus, and a plurality of master devices communicatively coupled to the communications bus and communicatively coupled to one another via a secondary arbitration connection. Each of the plurality of master devices may be configured to assert a respective secondary arbitration signal of the master device on the secondary arbitration connection to indicate ownership of the communications bus and deassert the respective secondary arbitration signal of the master device on the secondary arbitration connection to indicate non-ownership of the communications bus.

21 Claims, 2 Drawing Sheets

US 9,984,016 B2

SYSTEMS AND METHODS FOR HARDWARE ARBITRATION OF A COMMUNICATIONS BUS

TECHNICAL FIELD

The present disclosure relates in general to information handling systems, and more particularly to methods and systems for hardware arbitration of a communications bus of an information handling system, such as an inter-integrated circuit (I2C) bus.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may use a myriad of various internal communications buses, such as one or more I2C buses, to communicate data or instructions between information handling resources of the information handling system. In some cases, a plurality of "master" devices may be coupled to a bus, wherein such master devices may each be configured to perform input/output (I/O) operations with one or more "target" devices via the bus. In order that only one master device performs I/O at a given time, standards for some bus technologies may provide for an arbitration mechanism among master devices. However, some bus standards have disadvantages.

For example, in the I2C standard, native I2C arbitration procedures may not be sufficient when communicating with target devices, such as electrically erasable programmable read-only memories (EEPROMs) or other paged target devices. To illustrate, EEPROMs, other memory devices, or other target devices may support a maximum page size for a write operation which is coupled with a delay to allow the target device to commit the write operation. After such paged write operation, the master device may issue a stop condition before a complete write of all pages of the data to be written, which may open the I2C bus up to another arbitration process among master devices. Thus, because a write operation may take multiple I2C transactions to complete, other masters may access the bus prior to completion of the entire write operation, which can lead to undesirable conditions or results, such as data corruption that could occur due to a read occurring prior to all pages of a write operation being written to a target device.

This problem has long existed, particularly in I2C communication, and there has been a long-felt need for a solution which does not require a complicated software scheme in order to address the problem.

SUMMARY

In accordance with the teachings of the present disclosure, the disadvantages and problems associated with existing approaches to hardware arbitration on a communications bus may be reduced or eliminated.

In accordance with embodiments of the present disclosure, an information handling system may include a communications bus, at least one target device communicatively coupled to the communications bus, and a plurality of master devices communicatively coupled to the communications bus and communicatively coupled to one another via a secondary arbitration connection. Each of the plurality of master devices may be configured to assert a respective secondary arbitration signal of the master device on the secondary arbitration connection to indicate ownership of the communications bus and deassert the respective secondary arbitration signal of the master device on the secondary arbitration connection to indicate non-ownership of the communications bus.

In accordance with these and other embodiments of the present disclosure, a method may include in a master device of a plurality of master devices communicatively coupled to at least one target device via a communications bus, asserting a respective secondary arbitration signal of the master device on a secondary arbitration connection isolated from the communications bus to indicate ownership of the communications bus, and deasserting the respective secondary arbitration signal of the master device on the secondary arbitration connection to indicate non-ownership of the communications bus.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in a master device of a plurality of master devices communicatively coupled to at least one target device via a communications bus, assert a respective secondary arbitration signal of the master device on a secondary arbitration connection isolated from the communications bus to indicate ownership of the communications bus, and deassert the respective secondary arbitration signal of the master device on the secondary arbitration connection to indicate non-ownership of the communications bus.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
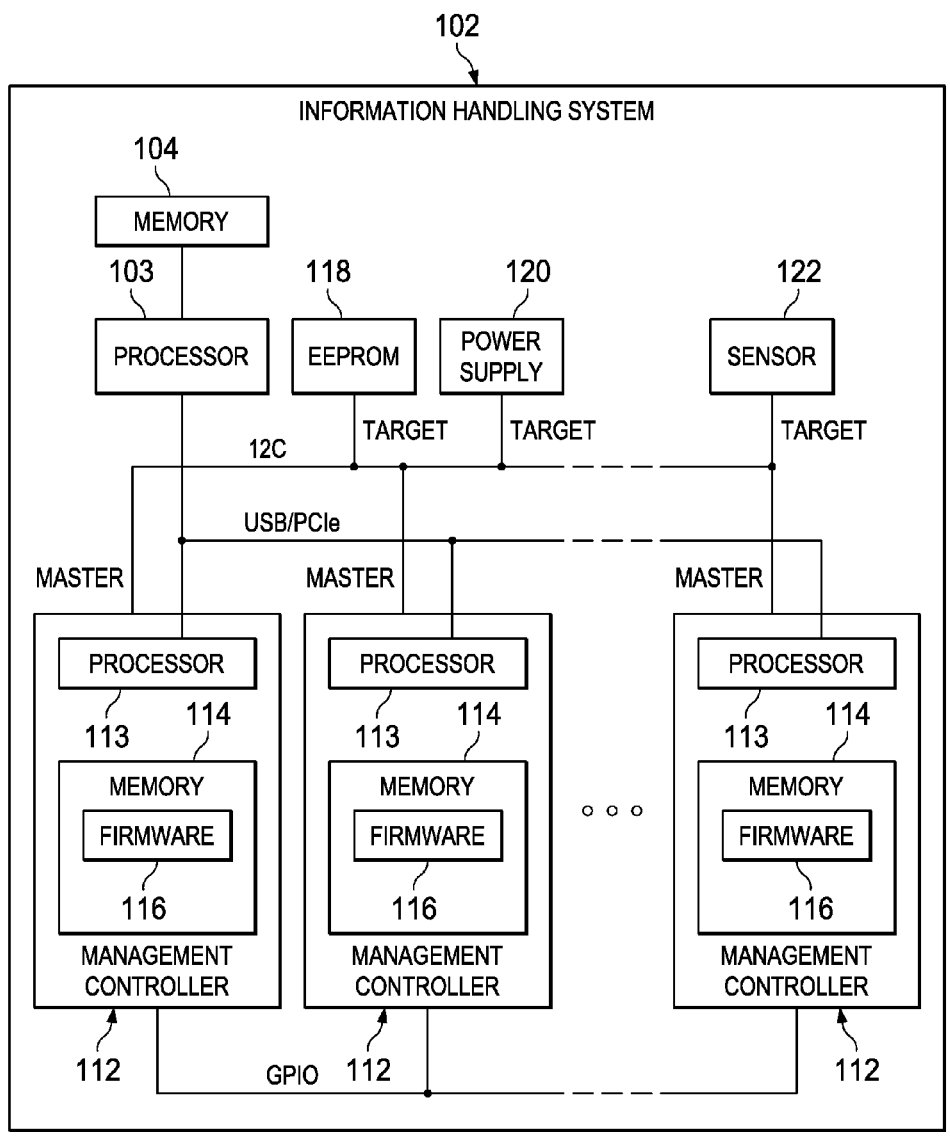
FIG. 1 illustrates a block diagram of an example information handling system, in accordance with embodiments of the present disclosure.
Figure 2:
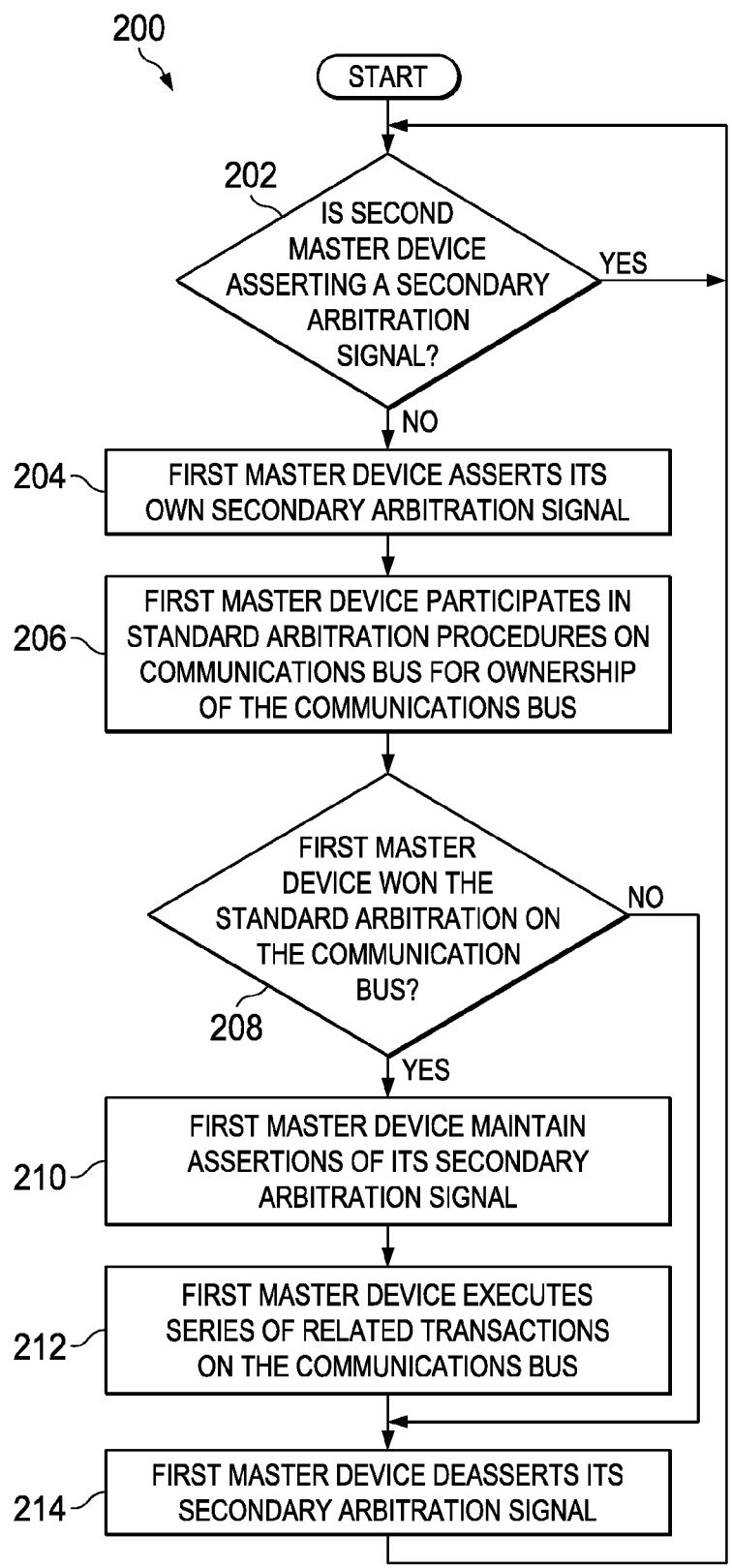
FIG. 2 illustrates a flow chart of an example method for hardware arbitration of a communications bus, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an information handling system 102. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.).

As depicted in FIG. 1, information handling system 102 may include a processor 103, a memory 104 communicatively coupled to processor 103, a plurality of management controllers 112 communicatively coupled to processor 103, an EEPROM 118 communicatively coupled to management controllers 112, a power supply 120 communicatively coupled to management controllers 112, and a sensor 122 communicatively coupled to management controllers 112.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

A management controller 112 may be communicatively coupled to processor 103 via a Universal Serial Bus (USB), Peripheral Component Interconnect Express (PCIe) bus, and/or any other suitable communications bus. A management controller may be configured to provide out-of-band management facilities for management of information handling system 102. Such management may be made by a management controller 112 even if information handling system 102 is powered off or powered to a standby state. A management controller 112 may include a processor 113 and memory 114. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, a management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware (e.g., firmware 116) which may comprise executable instructions which may be read and executed by processor 113 for carrying out the functionality of management controller 112.

EEPROM 118 may be communicatively coupled to management controllers 112 via an I2C bus, and may comprise any memory suitable to be configured to store data and which allows individual bytes to be erased and reprogrammed.

Power supply 120 may be communicatively coupled to management controllers 112 via the I2C bus, and may include any system, device, or apparatus configured to supply electrical current to one or more of processor 103, memory 104, management controller 112, EEPROM 118, sensor 122, and/or any other information handling resource of information handling system 102.

Sensor 120 may be communicatively coupled to management controllers 112 via an I2C bus, and may include any system, device, or apparatus, configured to sense a physical quantity (e.g., temperature) and communicate a signal indicative of such sensed physical quantity to management controllers 112 and/or one or more other information handling resources of information handling system 102.

As shown in FIG. 1, management controllers 112 may comprise master devices for controlling communication over the I2C bus. Although FIG. 1 may only depict management controllers 112 as master devices, in some embodiments, information handling system 102 may include other I2C master devices (e.g., one or more storage expanders, one or more power supplies, etc.) in addition to or in lieu of management controllers 112.

As shown in FIG. 1, EEPROM 118, power supply 120, and sensor 122 may comprise target devices for communicating with I2C master devices over the I2C bus. Although FIG. 1 may only depict EEPROM 118, power supply 120, and sensor 122 as target devices, in some embodiments, information handling system 102 may include other I2C target devices in addition to or in lieu of EEPROM 118, power supply 120, and/or sensor 122.

As shown in FIG. 1, management controllers 112 may be coupled to one another via a general purpose input/output (GPIO) connection coupling together designated GPIO pins of management controllers 112. In operation, this GPIO connection may be used to supplement standard I2C bus arbitration to allow a management controller 112 to assert ownership of the I2C bus by asserting its GPIO pin, which such management controller 112 may leave asserted until it completes all of the transactions it requires to complete an operation (e.g., a full write), after which it may deassert its GPIO pin. In addition, each management controller 112 may be configured to check its GPIO pin before initiating any actions on the I2C bus, thus ensuring that no other supported master device on the I2C bus will interrupt a series of transactions issued by the master device asserting its GPIO pin.

FIG. 2 illustrates a flow chart of an example method 200 for hardware arbitration of a communications bus, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, a first master device (e.g., management controller 112) of a communications bus (e.g., the I2C bus) that has I/O transactions for the communication bus may determine whether a second master device is asserting a secondary arbitration signal (e.g., asserting its GPIO pin), thus indicating that the second master device presently owns the communications bus. The first master device may make this determination by analyzing a signal present at a particular signal input of the first master device (e.g., a GPIO pin of the first master device). If a second master device is not asserting its secondary arbitration signal, method 200 may proceed to step 204. Otherwise, method 200 may repeat step 202 until such time that the first master device determines that no other master device is asserting its secondary arbitration signal.

At step 204, in response to no other master device asserting its secondary arbitration signal, the first master device may assert its own secondary arbitration signal (e.g., by asserting its own GPIO pin), in order to attempt to indicate ownership of the communications bus. In situations in which the first master device only requires a single transaction on the communications bus (e.g., not multiple related transactions), it may not need to and thus may not assert its own secondary arbitration signal.

At step 206 (either after or concurrently with step 204), the first master device may also participate in standard arbitration procedures on the communications bus (e.g., standard I2C arbitration) for ownership of the communications bus. At step 208, the first master device may determine whether it won the standard arbitration on the communication bus. If the first master device won the standard arbitration on the communication bus, method 200 may proceed to step 210. Otherwise, if the first master device lost the standard arbitration on the communication bus, method 200 may proceed to step 214. Making sure that a master device wins standard arbitration before maintaining assertion of its own secondary arbitration signal ensures that race conditions of master devices in asserting their own secondary arbitration signals are properly handled.

At step 210, in response to winning the standard arbitration on the communication bus, the first master device may maintain assertion of its secondary arbitration signal. At step 212, the first master device may execute a series of related transactions (e.g., multiple write transactions of individual pages of a larger write operation) on the communications bus.

At step 214, in response to losing the standard arbitration on the communication bus or completing its series of related transactions, the first master device may deassert its secondary arbitration signal. After completion of step 214, method 200 may proceed again to step 202.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order. For example, in some embodiments, the order of steps 204 and 206 may be switched (e.g., so long as the secondary arbitration signal is driven prior to completion of the first of a plurality of related transactions on the communications bus).

Method 200 may be implemented using information handling system 102 or any other system operable to implement method 200. In certain embodiments, method 200 may be implemented partially or fully in software and/or firmware (e.g., firmware 116) embodied in computer-readable media.

Advantageously, the systems and methods disclosed herein may overcome one or more of the disadvantages of traditional approaches for arbitration of a communications bus, particularly an I2C bus, while requiring little or no changes to the standard of the communication bus. These systems and methods may also allow for more effective bus recovery in a multi-master environment, as only the master that owns the bus may be allowed to perform recovery such as timing out data, forcing stops to unfreeze target devices, or turning off target devices for a hard reset. Undertaking such remedial steps in a multi-master environment may be destructive if done incorrectly.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a communications bus;
   at least one target device communicatively coupled to the communications bus;
   a plurality of master devices communicatively coupled to the communications bus and communicatively coupled to one another via a secondary arbitration connection, wherein each of the plurality of master devices is configured to:
   assert a respective secondary arbitration signal of the master device on the secondary arbitration connection to indicate ownership of the communications bus;
   deassert the respective secondary arbitration signal of the master device on the secondary arbitration connection to indicate non-ownership of the communications bus;
   participate in a standard arbitration procedure on the communications bus;
   determine if another master device has asserted ownership of the communications bus by asserting the secondary arbitration signal of the other master device on the secondary arbitration connection; and
   maintain assertion of its respective secondary arbitration signal and perform input/output transactions with the at least one target device via the communications bus responsive to winning the standard arbitration procedure and determining that another master device has not asserted ownership of the communications bus.

2. The information handling system of claim 1, wherein the communications bus comprises an Inter-Integrated Circuit bus.

3. The information handling system of claim 1, wherein the at least one target device comprises at least one of a sensor, a memory, and a power supply.

4. The information handling system of claim 1, wherein the at least one target device comprises a device having a maximum page size for input/output operations to the device.

5. The information handling system of claim 1, wherein the secondary arbitration connection comprises a connection between respective general purpose input/output pins of each of the plurality of master devices.

6. The information handling system of claim 1, wherein each master device is configured to deassert its respective secondary arbitration signal responsive to losing the standard arbitration procedure.

7. The information handling system of claim 1, wherein the at least one target device may comprise one of the plurality of master devices.

8. A method comprising, in a master device of a plurality of master devices communicatively coupled to at least one target device via a communications bus:
   asserting a respective secondary arbitration signal of the master device on a secondary arbitration connection isolated from the communications bus to indicate ownership of the communications bus;
   deasserting the respective secondary arbitration signal of the master device on the secondary arbitration connection to indicate non-ownership of the communications bus;
   participating in a standard arbitration procedure on the communications bus;
   determining if another master device has asserted ownership of the communications bus by asserting the secondary arbitration signal of the other master device on the secondary arbitration connection; and
   maintaining assertion of its respective secondary arbitration signal and performing input/output transactions with the at least one target device via the communications bus responsive to winning the standard arbitration procedure and determining that another master device has not asserted ownership of the communications bus.

9. The method of claim 8, wherein the communications bus comprises an Inter-Integrated Circuit bus.

10. The method of claim 8, wherein the at least one target device comprises at least one of a sensor, a memory, and a power supply.

11. The method of claim 8, wherein the at least one target device comprises a device having a maximum page size for input/output operations to the device.

12. The method of claim 8, wherein the secondary arbitration connection comprises a connection between respective general purpose input/output pins of each of the plurality of master devices.

13. The method of claim 8, further comprising, in the master device, deasserting its respective secondary arbitration signal responsive to losing the standard arbitration procedure.

14. The method of claim 8, wherein the at least one target device may comprise one of the plurality of master devices.

15. An article of manufacture comprising:

a non-transitory computer-readable medium; and computer-executable instructions carried on the computer-readable medium, the instructions readable by a processor, the instructions, when read and executed, for causing the processor to, in a master device of a plurality of master devices communicatively coupled to at least one target device via a communications bus:

- assert a respective secondary arbitration signal of the master device on a secondary arbitration connection isolated from the communications bus to indicate ownership of the communications bus; and
- deassert the respective secondary arbitration signal of the master device on the secondary arbitration connection to indicate non-ownership of the communications bus;
- participate in a standard arbitration procedure on the communications bus;
- determine if another master device has asserted ownership of the communications bus by asserting the secondary arbitration signal of the other master device on the secondary arbitration connection; and
- maintain assertion of its respective secondary arbitration signal and perform input/output transactions with the at least one target device via the communications bus responsive to winning the standard arbitration procedure and determining that another master device has not asserted ownership of the communications bus.

16. The article of claim 15, wherein the communications bus comprises an Inter-Integrated Circuit bus.

17. The article of claim 15, wherein the at least one target device comprises at least one of a sensor, a memory, and a power supply.

18. The article of claim 15, wherein the at least one target device comprises a device having a maximum page size for input/output operations to the device.

19. The article of claim 15, wherein the secondary arbitration connection comprises a connection between respective general purpose input/output pins of each of the plurality of master devices.

20. The article of claim 15, the instructions for further causing the processor to, in the master device, deassert its respective secondary arbitration signal responsive to losing the standard arbitration procedure.

21. The article of claim 15, wherein the at least one target device may comprise one of the plurality of master devices.

* * * * *